(12) United States Patent
Lee

(10) Patent No.: US 10,704,720 B2
(45) Date of Patent: Jul. 7, 2020

(54) TUBE ASSEMBLY

(71) Applicant: DONGGUAN GATEWAY PLASTIC AND HARDWARE LIGHTING CO., LTD., Dongguan, Guangdong (CN)

(72) Inventor: Chih-Hsin Lee, Taipei (TW)

(73) Assignee: DONGGUAN GATEWAY PLASTIC AND HARDWARE LIGHTING CO., LTD., Dongguan, Guangdong (CN)

( * ) Notice: Subject to any disclaimer, the term of this patent is extended or adjusted under 35 U.S.C. 154(b) by 201 days.

(21) Appl. No.: 15/700,868

(22) Filed: Sep. 11, 2017

(65) Prior Publication Data

US 2018/0340640 A1 Nov. 29, 2018

(30) Foreign Application Priority Data

May 23, 2017 (TW) .............................. 106207361 A

(51) Int. Cl.
*F16L 33/22* (2006.01)

(52) U.S. Cl.
CPC ................................ *F16L 33/225* (2013.01)

(58) Field of Classification Search
CPC ... F16L 27/08; F16L 27/0804; F16L 27/0808; F16L 33/20; F16L 33/2071; F16L 33/2073; F16L 33/2076; F16L 35/00; F16L 57/005
USPC ....... 285/119, 242, 256, 272, 281, 280, 278, 285/382, 114, 115, 116
See application file for complete search history.

(56) References Cited

U.S. PATENT DOCUMENTS

| | | | | |
|---|---|---|---|---|
| 2,295,830 A | * | 9/1942 | Carlson | F16L 35/00 138/110 |
| 3,347,571 A | * | 10/1967 | New | F16L 33/2073 285/222.4 |
| 3,831,635 A | * | 8/1974 | Burton | F16L 35/00 138/103 |
| 4,068,867 A | * | 1/1978 | Rodgers | F16L 27/0808 285/148.15 |
| 4,498,691 A | * | 2/1985 | Cooke | F16L 33/2076 285/12 |
| 5,190,323 A | * | 3/1993 | Oetiker | B21D 39/046 285/39 |
| 5,255,944 A | * | 10/1993 | Blin | F16L 33/2076 285/222.2 |
| 5,286,068 A | * | 2/1994 | Wiebe | F16L 33/24 285/114 |
| 5,622,394 A | * | 4/1997 | Soles | F16L 33/2076 285/256 |

(Continued)

*Primary Examiner* — Aaron M Dunwoody
(74) *Attorney, Agent, or Firm* — Li & Cai Intellectual Property (USA) Office

(57) ABSTRACT

A tube assembly for delivering a substance is provided. The tube assembly includes a tube body, a sleeve body, a joint member, a handle member and a fixing member. The tube body has a tube end portion. The sleeve body is fitted around the tube body and has a sleeve end portion corresponding to the tube end portion. The tube end portion is fitted around one end of the joint member. The handle member is fitted around the sleeve body. The fixing member is fitted around the sleeve end portion, the handle member and the joint member at the same time so that the fixing member presses a part of the handle member, a part of the sleeve end portion and a part of the joint member inwards in a manner such that the tube body, the sleeve body and the handle member are fixed relative to the joint member.

7 Claims, 6 Drawing Sheets

(56) References Cited

U.S. PATENT DOCUMENTS

| | | | | |
|---|---|---|---|---|
| 6,447,017 | B1* | 9/2002 | Gilbreath | F16L 33/2075 |
| | | | | 285/256 |
| 6,575,500 | B1* | 6/2003 | Wili | F16L 33/2073 |
| | | | | 285/243 |
| 7,849,884 | B2* | 12/2010 | Dickel | F16L 11/115 |
| | | | | 138/109 |
| 2001/0004154 | A1* | 6/2001 | Sausner | B21D 39/046 |
| | | | | 285/256 |
| 2002/0117851 | A1* | 8/2002 | Brugmann | F16L 33/2076 |
| | | | | 285/256 |
| 2004/0020545 | A1* | 2/2004 | Takagi | F16L 11/118 |
| | | | | 138/109 |
| 2006/0237964 | A1* | 10/2006 | Nielson | F16L 27/0808 |
| | | | | 285/272 |
| 2008/0036203 | A1* | 2/2008 | Piccinali | F16L 13/141 |
| | | | | 285/256 |
| 2009/0039649 | A1* | 2/2009 | Pan | F16L 19/086 |
| | | | | 285/382 |
| 2010/0194100 | A1* | 8/2010 | Koch | F16L 33/2076 |
| | | | | 285/256 |
| 2012/0186684 | A1* | 7/2012 | Giovannetti | F16L 11/082 |
| | | | | 138/137 |
| 2015/0177172 | A1* | 6/2015 | Upasani | F16L 11/086 |
| | | | | 324/693 |
| 2016/0258558 | A1* | 9/2016 | McCallister | F16L 11/081 |
| 2016/0312940 | A1* | 10/2016 | Melo | F16L 57/005 |
| 2017/0146168 | A1* | 5/2017 | Caprio | B60T 17/04 |
| 2018/0031158 | A1* | 2/2018 | Gaspar | F16L 33/225 |
| 2018/0224036 | A1* | 8/2018 | Ramaswamy | F16L 33/2076 |

\* cited by examiner

TUBE ASSEMBLY

BACKGROUND OF THE INVENTION

1. Technical Field

The present disclosure relates to a tube assembly; in particular, to a tube assembly for delivering a gas.

2. Description of Related Art

Air delivery tubes on the market are usually made of rubber and plastic, e.g. Polyurethane (PU) and Polyvinyl chloride (PVC), having high densities and thus the disadvantages of being heavy and difficult to store or carry around.

An air delivery tube is applicable to devices supplying high pressure gas, e.g. an air compressor. However, most prior art air delivery tubes have no handles, and those having handles raise security concerns as the handles are mostly slidable relative to tube bodies. Furthermore, the connector between a prior art air delivery tube and an air compressor is often a rotary joint screwed onto the air compressor but is not rotatable relative to the tube body, causing the tube body to twist when connecting the air delivery tube to the air compressor and the connected end of the tube body is rotated. Therefore, when the air delivery tube is inflated with air, the twisted part of the tube body can swing back and forth, causing or even harm to the user. Therefore, air delivery tubes in the prior art are to be improved.

SUMMARY OF THE INVENTION

The primary purpose of the present disclosure is to provide a tube assembly, which has the advantage of being lightweight, easy to store and having a reduced tendency to tangle.

To address the above-mentioned problems, the present disclosure provides a tube assembly including a tube body, a sleeve body, a joint member, a handle member and a fixing member. The tube body has a tube end portion. The sleeve body is fitted around the tube body and has a sleeve end portion corresponding to the tube end portion. The tube end portion is fitted around one end of the joint member. The handle member is fitted around the sleeve body. The fixing member is fitted around the sleeve end portion, the handle member and the joint member at the same time so that the fixing member presses a part of the handle member, a part of the sleeve end portion and a part of the joint member inwards in a manner such that the tube body, the sleeve body and the handle member are fixed relative to the joint member.

The present disclosure has the following advantages:

1. The tube assembly provided by the present disclosure can fix the position of the joint member relative to the tube body, the sleeve body and the handle member through the technical solution of "the fixing member is fitted around the sleeve end portion, the handle member and the joint member at the same time so that the fixing member presses a part of the handle member, a part of the sleeve end portion and a part of the joint member inwards".
2. Through the above technical solution that the fixing member is fitted around the sleeve end portion, the handle member and the joint member at the same time, the tube assembly has a strong structure at both ends so that when connected to external air suppliers, air leakage at the junction can be prevented.
3. Through the technical solution that the handle member and the joint member are both fixed to the tube end portion, the security problems caused by the swinging tube body during the use of the tube assembly are solved.

In order to further the understanding of the present disclosure, the following embodiments are provided along with illustrations to facilitate the disclosure of the present disclosure.

DETAILED DESCRIPTION OF THE PREFERRED EMBODIMENTS

Figure 1:
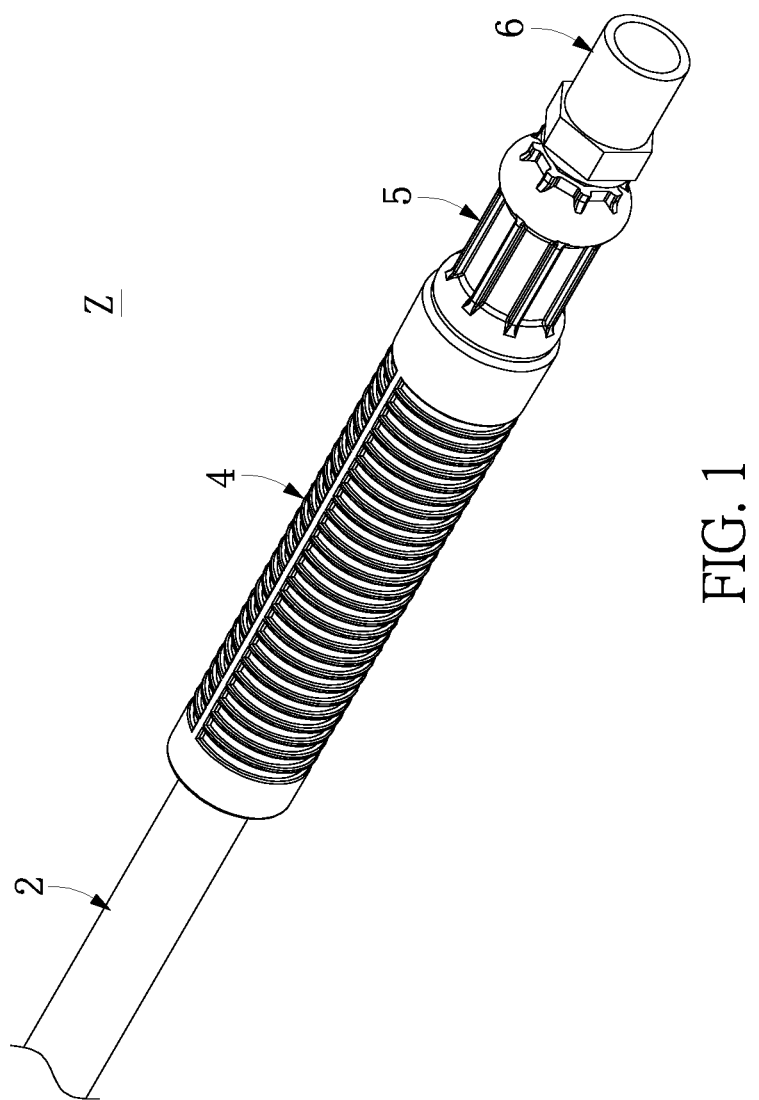
FIG. 1 is a perspective view illustrating a tube assembly according to a first embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

The First Embodiment

Figure 5:
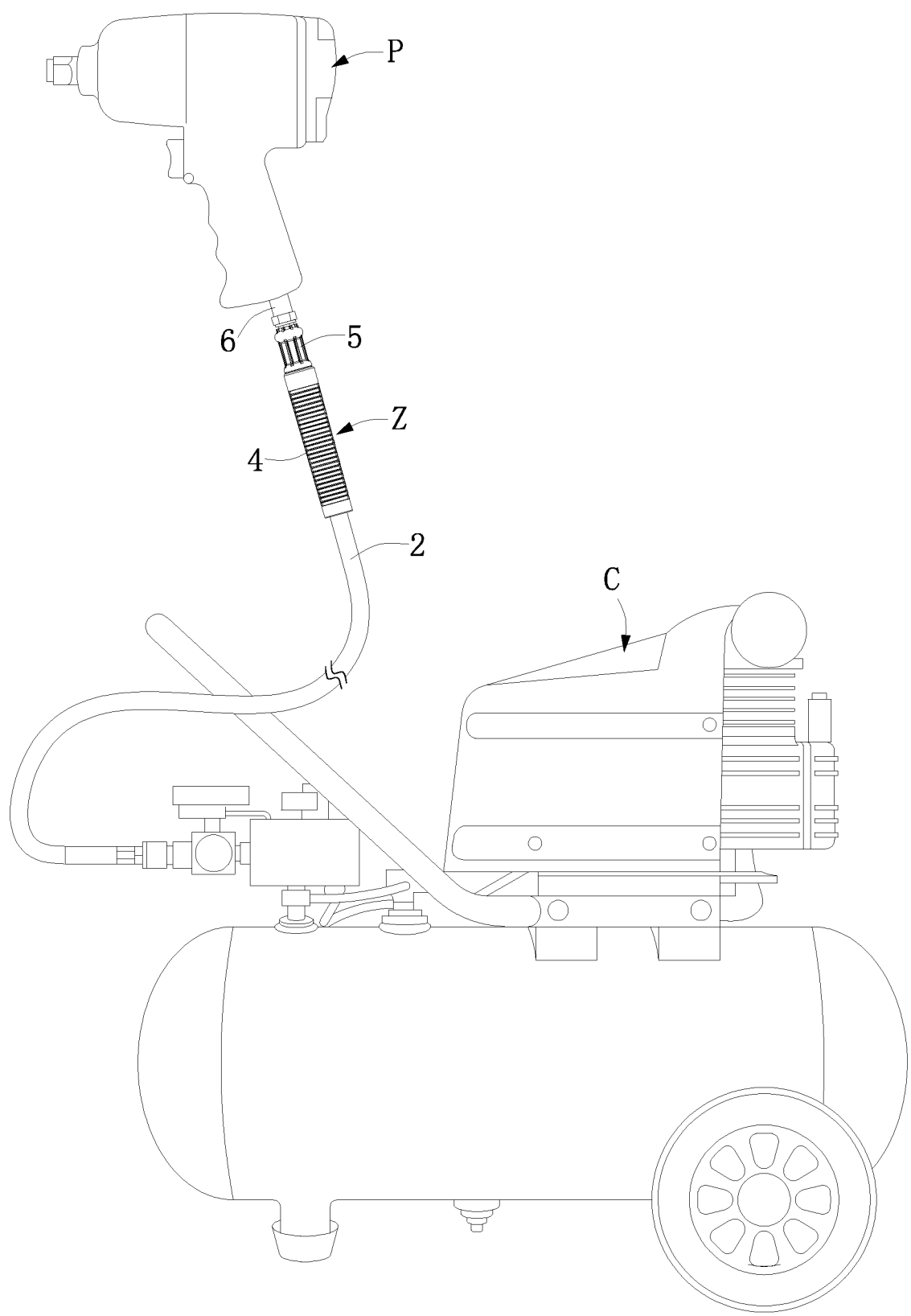
FIG. 5 is a schematic view illustrating the tube assembly according to the first embodiment of the present disclosure being applied to an air compressor and a pneumatic tool.

Referring to FIGS. 1 and 5, a first embodiment of the present disclosure provides a tube assembly Z including a tube body 1, a sleeve body 2, a joint member 3, a handle member 4, and a fixing member 5. Specifically, the tube assembly Z can have a joint member 3, a handle member 4 and a fixing member 5 at one end or both ends.

More specifically, the tube body 1 has a tube end portion 10, and the sleeve body 2 is fitted around the tube body 1. The sleeve body 2 has a sleeve end portion 20 corresponding to the tube end portion 10. In other words, the sleeve body 2 fully encloses the tube body 1 and the sleeve end portion 20 is on the outer side of the tube end portion 10, in which the sleeve end portion 20 encloses the tube end portion 10. The tube body 1 can be an elastic tube made by an extrusion process, and the sleeve body 2 is a fabric braided sleeve; however, the present disclosure is not limited thereto.

In addition, the tube end portion 10 of the tube body 1 is fitted around one end of the joint member 3, the handle member 4 is fitted around the sleeve body 2, and the fixing member 5 is fitted on the sleeve end portion 20, the handle member 4 and the joint member 3 at the same time so that the fixing member 5 presses a part of the handle member 4, a part of the sleeve end portion 20 and a part of the joint member 3 inwards in a manner such that the position of the joint member 3 relative to the tube body 1, the sleeve body 2 and the handle member 4 is fixed.

Figure 3:
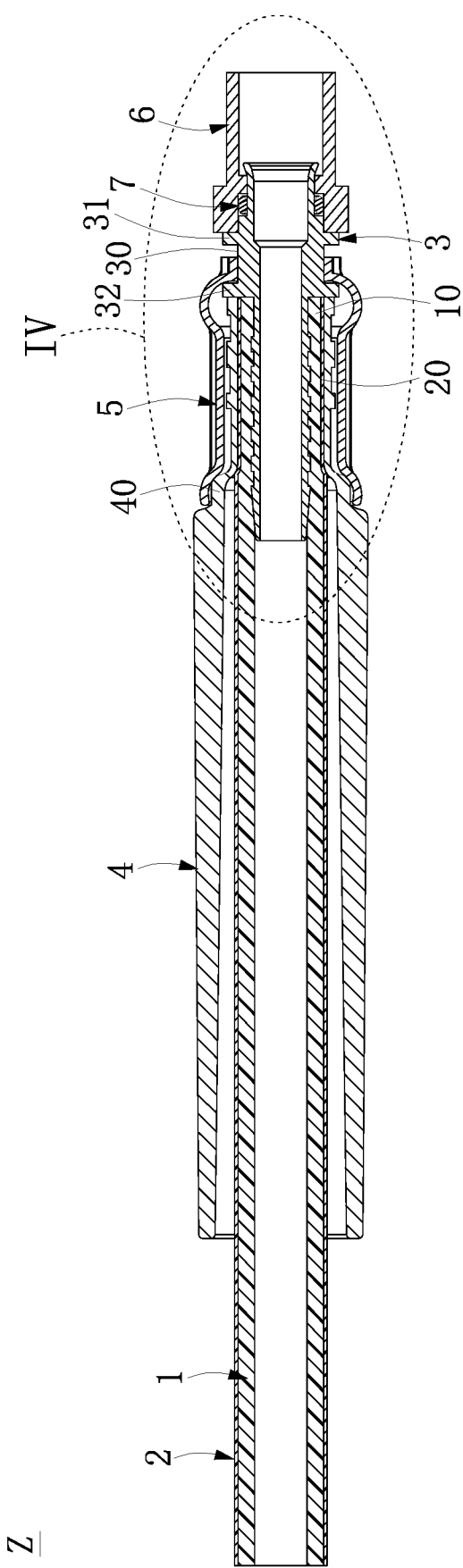
FIG. 3 is a sectional view illustrating the tube assembly according to the first embodiment of the present disclosure.
Figure 4:
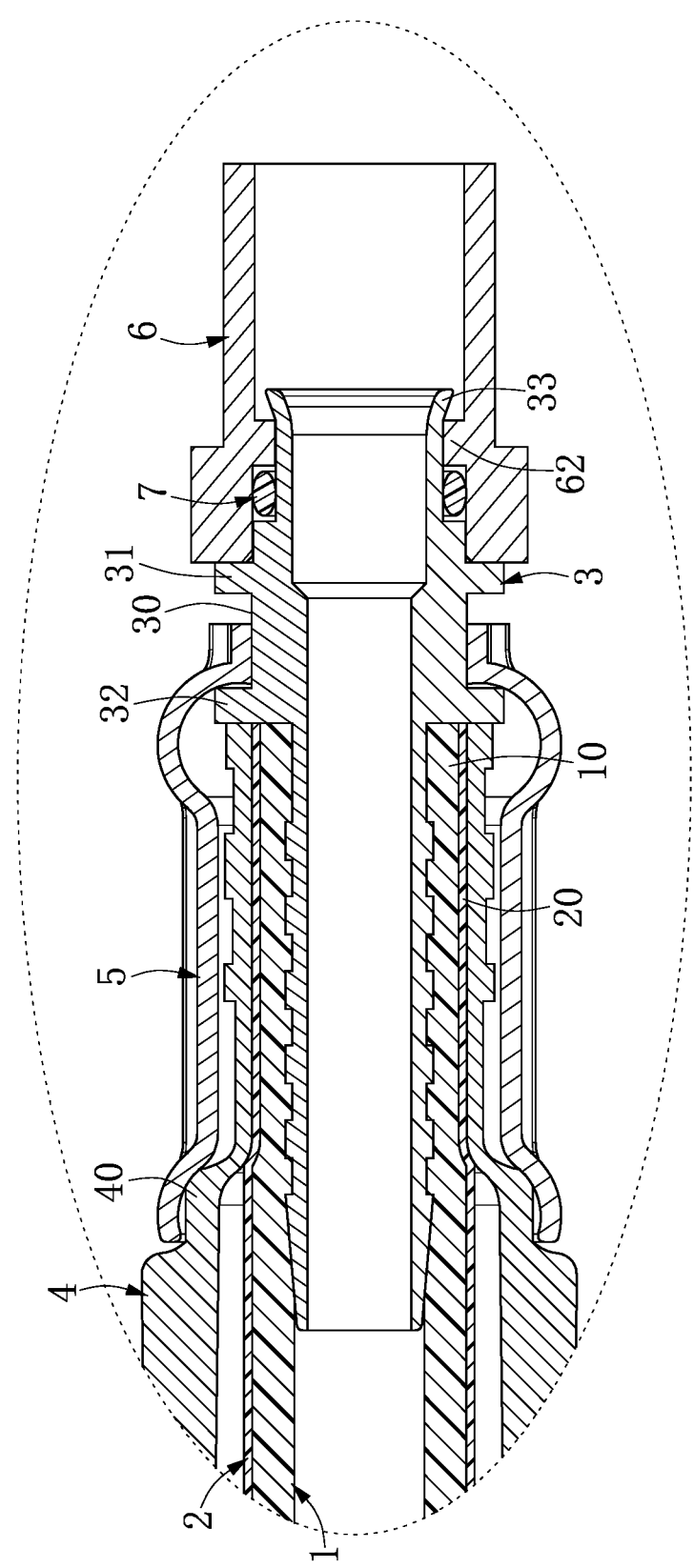
FIG. 4 is an enlarged view of area IV in FIG. 3.

With reference to FIG. 3 and FIG. 4, in the present disclosure, the joint member 3 includes a first retaining ring 31, a second retaining ring 32 and a retaining groove 30 disposed therebetween. A part of the fixing member 5 sinks into the retaining groove 30 such that the position of the fixing member 5 relative to the joint member 3 is fixed. With the retaining groove 30, the position of the fixing member 5 relative to the tube body 1, the sleeve body 2 and the handle member 4 can be fixed more securely. Referring to FIG. 4, the end portion of the fixing member 5 is fitted to the second retaining ring 32, by which the fixing member 5 will not fall off easily and the relative position between the fixing member 5 and the joint member 3 can be fixed more securely.

Specifically, when the tube assembly Z is applied to a pneumatic device, e.g. an air compressor with the tube end portion 10 of the tube body 1 being connected to a pneumatic tool and another end of the tube body 1 opposite the tube end portion 10 being connected to the air compressor, the connection between the tube body 1 and the pneumatic tool is strengthened since the relative position between the tube body 1 and the joint member 3 is secured by the fixing member 5. In this way, the pneumatic tool will not be separated from the tube body 1 by the impulsive forces exerted by the gas transported. The present disclosure is not limited thereto; in other embodiments, the tube assembly Z can be applied to other gas suppliers.

Specifically, the tube assembly Z can be applied to other types of pneumatic devices such as spray guns, staple guns, pneumatic staplers, and inflation devices. However, the present disclosure is not limited thereto. Moreover, the pneumatic device includes a nozzle through which various devices, e.g. beach ball and vehicle tire, can be inflated with air. Pneumatic tools are more effective, light and powerful than traditional electromotive tools. It should be noted that the present disclosure is not limited by the types of devices that the tube assembly Z is applied to.

In the present disclosure, the tube body 1 is an elastic tube made by an extrusion process and formed of a plastic material such as rubber, plastic or elastic composite materials, e.g. ethylene propylene diene monomer (EPDM). EPDM rubber has the advantages of being weatherproof, anti-abrasion, electrical insulation, anti-expansion and anti-corrosion. Furthermore, the sleeve body 2 is made of a fabric braided material, which exhibits a predetermined amount of radial expansion so as to restrict the amount of radial expansion of the tube body 1.

Figure 2:
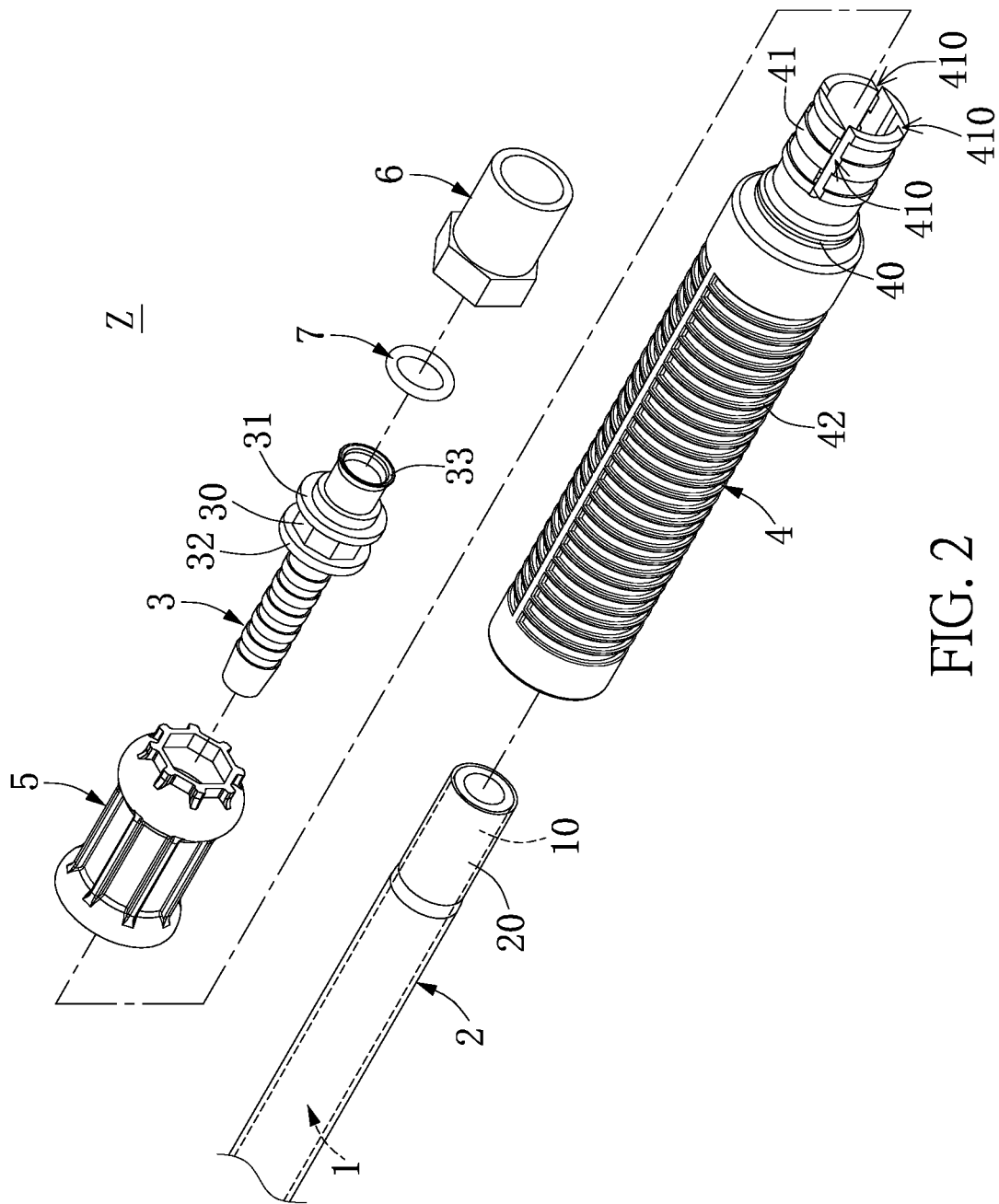
FIG. 2 is an exploded view illustrating the tube assembly according to the first embodiment of the present disclosure.

Specifically, with reference to FIG. 1 and FIG. 2, the natural length of the tube body 1 is approximately equal to that of the sleeve body 2 so that the sleeve body 2 is fitted to the tube body 1 when the tube body 1 is not in use. When the tube body 1 is used for delivering a gas, the amount of radial expansion of the tube body 1 can be restricted due to the predetermined amount of radial expansion of the sleeve body 2. In this way, excess expansion of the tube body 1, which may cause the tube body 1 to crack or break, can be prevented. In the present embodiment, the predetermined amount of radial expansion of the sleeve body 2 is 1% to 3%; however, the present disclosure is not limited thereto.

It is worth noting that the present disclosure is not limited by the materials of the tube body 1 and the sleeve body 2. In other embodiments, the tube body 1 can be made of other materials that enable the tube body 1 to expand radially and axially, and the sleeve body 2 can be made of other weaveable and expansible materials by a weaving process. Specifically, in the present disclosure, the sleeve body 2 has a high braided density and a small tendency to expand radially and axially. However, the present disclosure is not limited thereto. For example, in other embodiments, the sleeve body 2 can be expandable but with a predetermined level of elasticity. More specifically, the sleeve body 2 cannot expand beyond a certain limit determined by the predetermined level of elasticity so that the tube body 1 will not expand beyond a tolerance range.

With reference to FIG. 4 and FIG. 5, which shows the tube assembly Z being applied to an air compressor C and a pneumatic tool P, the tube assembly Z of the present embodiment further includes a connecting member 6 fitted around the other end of the joint member 3 away from the tube body 1 and connected between the joint member 3 and the pneumatic tool P such that the tube assembly Z is connected to the pneumatic tool P. As shown in FIG. 4, the first retaining ring 31 is abutted against a rear end of the connecting member 6. A front edge 33 of the joint member 3 is expanded outward to block an inner protrusion 62 of the connecting member 6, so as to prevent the connecting member 6 from escaping outward from the joint member 3. In addition, the end of the tube body 1 away from the handle member 4 is connected to the air compressor C. The present disclosure is not limited thereto. In other embodiments, the tube assembly Z can be applied to other air suppliers. Furthermore, the connecting member 6 can be, but not limited to an external thread connector or a push-fit swift connector.

In addition, the tube assembly Z of the present disclosure further includes an anti-leakage ring 7 fitted around the other end of the joint member 3 away from the tube body 1 and abutting between the joint member 3 and the connecting member 6. When the tube assembly Z delivers a gas, the anti-leakage ring 7 can prevent gas leakage from the gap between the joint member 3 and the connecting member 6. Furthermore, the connecting member 6 can rotate relative to the joint member 3; therefore, when the tube assembly Z is connected to the air compressor C through the connecting member 6, in which the connecting member 6 screws onto the air compressor C, the tube body 1 will not rotate along with the connecting member 6 since the connecting member 6 is rotatable relative to the tube body 1. In this way, the tube assembly Z of the present disclosure solves the inconvenience and insecurity caused by air delivery tubes in the prior art, whose twisted portions swing around when inflated with air.

Furthermore, the anti-leakage ring 7 is fitted around the joint member 3 on the outer surface thereof. However, the present disclosure is not limited thereto. In other embodiments, the joint member 3 further includes a groove (not shown in the drawings) disposed around one end of the joint member 3 away from the tube end portion 10, and the anti-leakage ring 7 is disposed in the groove and protrudes therefrom, abutting between the joint member 3 and the connecting member 6. In other words, the anti-leakage ring 7 is retained by the groove so that the anti-leakage ring 7 can encircle the joint member 3 securely.

In the present embodiment, the fixing member 5 is formed by being pressed towards the sleeve end portion 20, the handle member 4 and the joint member 3. More specifically, the fixing member 5 is a rivet which squeezes the tube body 1, the sleeve body 2 and the handle member 4 along the radial direction of the joint member 3 such that the fixing member 5 encloses a part of the handle member 4, a part of the sleeve end portion 20 and a part of the joint member 3 securely. In this way, the position of the joint member 3 relative to the tube body 1, the sleeve body 2 and the handle member 4 can be fixed.

With reference to FIG. 2, the handle member 4 includes a rear section 42 for a user's holding and a front section 41. The front section 41 is extended from an end of the rear section 42 and positionally corresponds to the sleeve end portion 20. The front section 41 has four through slits 410 corresponding to the sleeve end portion 20. The through slits 410 are extended from a free end of the front section 41 toward the rear section 2 along a longitudinal direction thereof. More specifically, the position of the four through slits 410 correspond to that of the sleeve end portion 20 in a manner such that the sleeve end portion 20 is exposed from the four through slits 410. When the fixing member 5 is pressed towards the handle member 4, the sleeve body 2, the tube body 1 and the joint member 3, the fixing member 5 can contact and squeeze the handle member 4 and the sleeve end portion 20 through the through slits 410 at the same time. Through the above manner, the fixing member 5, the handle member 4 and the sleeve end portion 20 can be fixed together.

The handle of an air delivery tube in the prior art does not have hollowed portions that expose the sleeve, the reason for which is that the handle in the prior art is made to be slidable relative to the sleeve and is not meant to be fixed thereto. Therefore, a handle structure that allows the handle to be fixed on the sleeve is not required. However, if the handle member 4 is slidable relative to the tube body 1, which means that the tube body 1 might swing around when inflated with air, the user would not be able to control the movement of the tube body 1. Therefore, a prior art handle that is slidable relative to the tube body may raise concerns over security.

Moreover, in the present embodiment, the handle member 4 includes a retaining portion 40 at one end thereof near the sleeve end portion 20. A part of the fixing member 5 sinks into the retaining portion 40 such that the position of the fixing member 5 relative to the handle member 4 is fixed. Therefore, with the retaining portion 40 of the handle member 4, the relative position between the fixing member 5 and the handle member 4 can be fixed more securely.

It should be noted that, in other embodiments, the sleeve body 2, the joint member 3, the handle member 4, the fixing member 5, the connecting member 6 and the anti-leakage ring 7 can also be disposed on the end of the tube body 1 that is connected to the air compressor C, and the interconnection therebetween is identical to that of the components of the tube assembly Z, which will not be further described herein. With the tube assembly Z being disposed on both ends of the tube body 1, the connection between the tube body 1 and the pneumatic tool P and that between the tube body 1 and the air compressor C can both be strengthened, which prevents gas leakage and extends the service life of the tube body 1.

Through the above mentioned technical manners, the tube assembly Z of the present disclosure has the advantages of being light, easy to store, and having a reduced tendency to tangle.

The Second Embodiment

Figure 6:
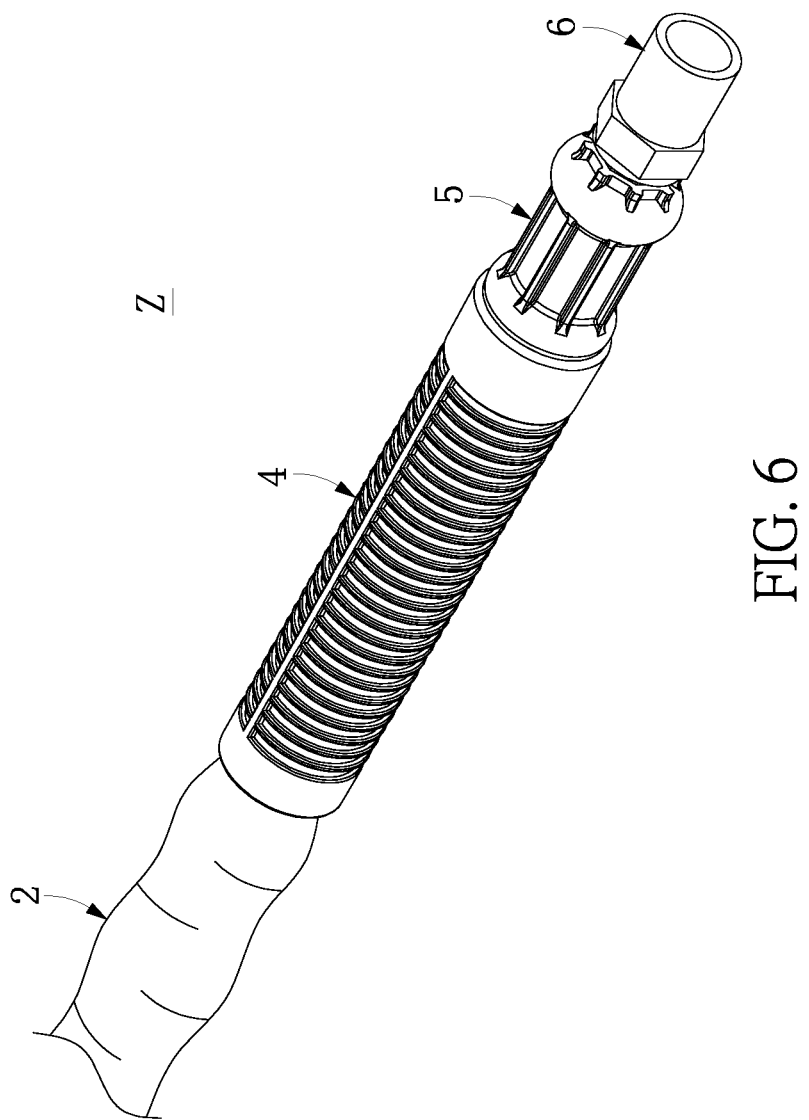
FIG. 6 is a perspective view illustrating a tube assembly according to a second embodiment of the present disclosure.

Referring to FIG. 6, the major components of the second embodiment are similar to those of the first embodiment, and the similarities therebetween will not be further described herein. The difference therebetween is that the tube body 1 has a natural length smaller than the axial length of the sleeve body 2. As shown in FIG. 6, without support from the inside, the sleeve body 2 drapes on the tube body 1 with loose folds.

More specifically, as in the previous embodiment, the tube body 1 of the present embodiment is made of an elastic material, and the sleeve body 2 is a fabric braided sleeve, in which the sleeve body 2 is radially and axially inexpansible. The major difference between the present embodiment and the previous embodiment is that the tube body 1 of the present embodiment has a smaller natural length diameter. When the tube assembly Z is in use, the inner pressure of the tube body 1 increases, causing the tube body 1 to expand. Since the sleeve body 2 has a predetermined axial length and is inexpansible, the tube body 1 can only expand until the tube body 1 is equally long as the sleeve body 2 and has an external diameter equal to the inner diameter of the sleeve body 2, that is to say, the maximum length and external diameter of the tube body 1 is respectively equal to the predetermined axial length and inner diameter of the sleeve body 2.

By the aforementioned technical solution, the tube assembly Z of the present disclosure is easy to store and occupies little space. It should be noted that the present disclosure is not limited to the above embodiments. In other embodiment, the sleeve body 2 can be an expansible sleeve body and exhibits a predetermined amount of radial and axial expansion. In other words, the sleeve body 2 can only expand to a certain extent so as to limit the radial and axial expansion of the tube body 1. In addition, the sleeve body 2 can have a small axial length so that the tube assembly Z is easier to store.

Through the above mentioned technical solutions, the present disclosure has the following advantages:

1. The tube assembly provided by the present disclosure can fix the position of the joint member relative to the tube body, the sleeve body and the handle member through the technical solution of "the fixing member is fitted around the sleeve end portion, the handle member and the joint member at the same time so that the fixing member presses a part of the handle member, a part of the sleeve end portion and a part of the joint member inwards".

2. Through the technical solution that the handle member, the joint member are fixed to the tube end portion by the fixing member, the present disclosure solves the security issue in the prior art where the user cannot control the twisted and swinging tube body when the gas delivery tube is in use. Furthermore, the installation of the tube assembly Z onto other gas supplier devices can be facilitated with the handle member of the present disclosure being fixed to the tube end portion.

3. The tube assembly of the present disclosure includes a connecting member disposed between the joint member and the gas supplier and rotatable relative to the joint member, contributing to easier installation, convenience in storage and the reduced tendency of the tube body to tangle.

4. The joint member can include a retaining groove, a first retaining ring and a second retaining ring, in which one end of the fixing member sinks into the retaining groove and is thus retained between the first retaining ring and the second retaining ring in a manner such that the fixing member, the handle member, the sleeve end portion and the joint member are fixed together more securely.

5. The sleeve body is made of a weaveable material by a weaving process, which makes the tube assembly of the present disclosure light and easy to carry around.

6. The sleeve body exhibits a predetermined amount of radial expansion so as to limit the amount of radial expansion of the tube body, preventing elastic fracture of the tube body. Furthermore, fitted around the tube body, the sleeve body restricts the expansion thereof so that the tube body would not expand rapidly when delivering a high pressure gas.

7. The tube body is made of EPDM rubber, which has the advantages of being weatherproof, anti-abrasion, electrical insulation, anti-expansion and anti-corrosion.

Through the structural solution that the handle member and the joint member are both fixed to the tube end portion, the security problems caused by swinging tube body during the use of the tube assembly are solved.

The above-mentioned descriptions represent merely the exemplary embodiment of the present disclosure, without any intention to limit the scope of the present disclosure thereto. Various equivalent changes, alterations or modifications based on the claims of the present disclosure are all consequently viewed as being embraced by the scope of the present disclosure.

What is claimed is:

1. A tube assembly for delivering a substance, comprising:
a tube body having a tube end portion;
a sleeve body fitted around the tube body, wherein the sleeve body has a sleeve end portion positionally corresponding to the tube end portion, and the tube end portion is surrounded by the sleeve end portion of the sleeve body;
a joint member, and one end portion of the joint member surrounded by the tube end portion of the tube body;
a handle member fitted around the sleeve body, wherein the handle member has a rear section for a user's holding and a front section, the front section is extended from an end of the rear section and positionally corresponds to the sleeve end portion, the front section has a plurality of through slits formed thereon, the through slits are extended from a free end of the front section toward the rear section along a longitudinal direction thereof, and the sleeve end portion is exposed from the through slits;
a fixing member fitted around the front section of the handle member, the sleeve end portion and the joint member at the same time so that the fixing member presses the front section of the handle member, a part of the sleeve end portion and a part of the joint member inwards in a manner such that the tube body, the sleeve body and the handle member are fixed relative to the joint member; wherein when the fixing member is pressed towards the front section of the handle member, the fixing member is capable of contacting and squeezing the front section and the sleeve end portion through the through slits at the same time;
a connecting member fitted around another end of the joint member; and
an anti-leakage ring fitted around the another end of the joint member, which is opposite to the tube end portion and abutting between the joint member and the connecting member, wherein the connecting member is rotatable relative to the joint member.

2. The tube assembly according to claim 1, wherein the tube body is elastic.

3. The tube assembly according to claim 1, wherein the tube body is radially and axially inexpansible.

4. The tube assembly according to claim 1, wherein the connecting member is rotatable relative to the joint member.

5. The tube assembly according to claim 1, wherein the fixing member is a rivet formed by being pressed towards the tube body, the sleeve body and the handle member, which are squeezed by the fixing member and move towards the joint member in a radial direction of the joint member.

6. The tube assembly according to claim 1, wherein the handle member includes a retaining portion between the front section and the rear section, a part of the fixing member sinking into the retaining portion in a manner such that the position of the fixing member relative to the handle member is fixed.

7. The tube assembly according to claim 1, wherein the joint member includes a first retaining ring, a second retaining ring and a retaining groove disposed therebetween, a part of the fixing member sinking into the retaining groove such that the position of the fixing member relative to the joint member is fixed, wherein the first retaining ring is abutted against a rear end of the connecting member, and a front edge of the joint member is expanded outward to block an inner protrusion of the connecting member, so as to prevent the connecting member from escaping outward from the joint member.

* * * * *